US012573688B2

(12) United States Patent
Yun et al.

(10) Patent No.: US 12,573,688 B2
(45) Date of Patent: Mar. 10, 2026

(54) COOLANT PORT ASSEMBLY

(71) Applicant: LG ENERGY SOLUTION, LTD.,
Seoul (KR)

(72) Inventors: Seung-Hyun Yun, Daejeon (KR);
Yong-Shik Shin, Daejeon (KR);
Young-Jin Kim, Daejeon (KR);
Do-Wung Son, Daejeon (KR);
Byeong-Yoon Jung, Daejeon (KR);
Seung-Jae Cho, Daejeon (KR);
Sung-Man Choi, Daejeon (KR)

(73) Assignee: LG ENERGY SOLUTION, LTD.,
Seoul (KR)

( * ) Notice: Subject to any disclaimer, the term of this
patent is extended or adjusted under 35
U.S.C. 154(b) by 712 days.

(21) Appl. No.: 17/798,749

(22) PCT Filed: Nov. 3, 2021

(86) PCT No.: PCT/KR2021/015827
§ 371 (c)(1),
(2) Date: Aug. 10, 2022

(87) PCT Pub. No.: WO2022/098097
PCT Pub. Date: May 12, 2022

(65) Prior Publication Data
US 2023/0112109 A1　Apr. 13, 2023

(30) Foreign Application Priority Data
Nov. 5, 2020　(KR) ........................ 10-2020-0146831

(51) Int. Cl.
H01M 10/6567 (2014.01)
F16L 5/08 (2006.01)
(Continued)

(52) U.S. Cl.
CPC ........... H01M 10/6567 (2015.04); F16L 5/08
(2013.01); H01M 10/6556 (2015.04);
(Continued)

(58) Field of Classification Search
None
See application file for complete search history.

(56) References Cited

U.S. PATENT DOCUMENTS

| | | | |
|---|---|---|---|
| 2009/0315274 A1 | 12/2009 | Wu | |
| 2022/0003346 A1* | 1/2022 | Ryman | ..................... F16L 5/027 |
| 2022/0221084 A1 | 7/2022 | Huang et al. | |

FOREIGN PATENT DOCUMENTS

| | | | |
|---|---|---|---|
| CN | 208753473 U | 4/2019 | |
| CN | 110212133 A * | 9/2019 | ................ F16L 5/10 |

(Continued)

OTHER PUBLICATIONS

English_Translation_of_CN_110212133_A (Year: 2019).*

(Continued)

*Primary Examiner* — Niki Bakhtiari
*Assistant Examiner* — Dustin Van Kirk
(74) *Attorney, Agent, or Firm* — Birch, Stewart, Kolasch
& Birch, LLP

(57) ABSTRACT

A coolant port assembly includes a coolant port including a
port portion having a pipe shape formed to extend by a
predetermined length, and a plate-shaped mounting bracket
portion formed at one side of an outer circumference of the
port portion to expand in a direction intersecting a longitu-
dinal direction of the port portion; a sealing gasket provided
in a ring shape that surrounds a peripheral outer side of the
port portion; and a gasket cover configured to be closely
coupled to the mounting bracket portion together with the
sealing gasket while pressing a part of the sealing gasket.

9 Claims, 4 Drawing Sheets

(51) Int. Cl.
    *H01M 10/613*     (2014.01)
    *H01M 10/6556*     (2014.01)
    *H01M 50/20*     (2021.01)
    *H01M 50/204*     (2021.01)

(52) U.S. Cl.
    CPC .......... *H01M 50/20* (2021.01); *H01M 10/613*
    (2015.04); *H01M 50/204* (2021.01)

(56) References Cited

FOREIGN PATENT DOCUMENTS

| | | | |
|---|---|---|---|
| CN | 210566905 | U | 5/2020 |
| JP | 5222026 | B2 | 6/2013 |
| KR | 20-0346582 | Y1 | 4/2004 |
| KR | 10-0767537 | B1 | 10/2007 |
| KR | 10-2010-0002034 | A | 1/2010 |
| KR | 10-2012-0012648 | A | 2/2012 |
| KR | 20-2012-0007452 | U | 10/2012 |
| KR | 10-2014-0137153 | A | 12/2014 |
| KR | 10-2020-0041007 | A | 4/2020 |
| KR | 10-2121815 | B1 | 6/2020 |
| KR | 10-2020-0107107 | A | 9/2020 |
| KR | 20200107107 | A * | 9/2020 ........ H01M 10/6556 |
| WO | WO-2020108764 | A1 * | 6/2020 ............ F16L 37/008 |

OTHER PUBLICATIONS

English_Translation_of_KR_20200107107_A (Year: 2020).*
English_Translation_of_WO_2020108764_A1 (Year: 2020).*
English machine translation of CN-110212133-A, dated Sep. 6, 2019.
English machine translation of KR-10-2020-0107107-A, dated Sep. 16, 2020.
Extended European Search Report for European Application No. 21889562.1, dated Sep. 13, 2023.
International Search Report (PCT/ISA/210) issued in PCT/KR2021/015827 mailed on Feb. 28, 2022.

* cited by examiner

FIG. 1 - Conventional Art
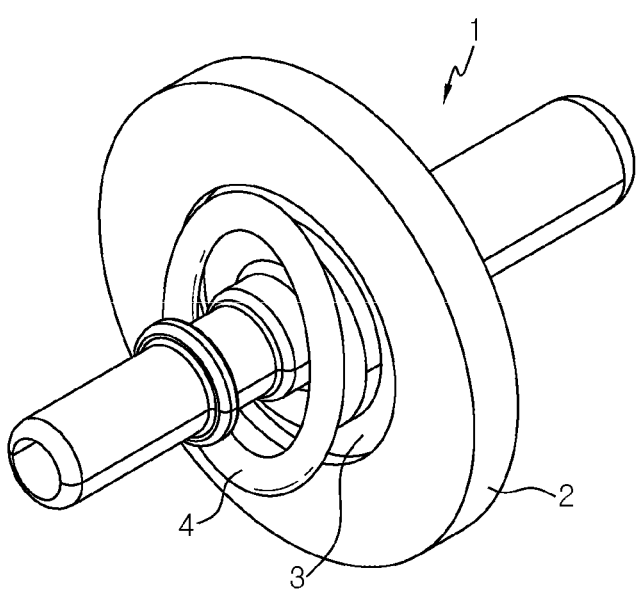
FIG. 2
<u>100</u>
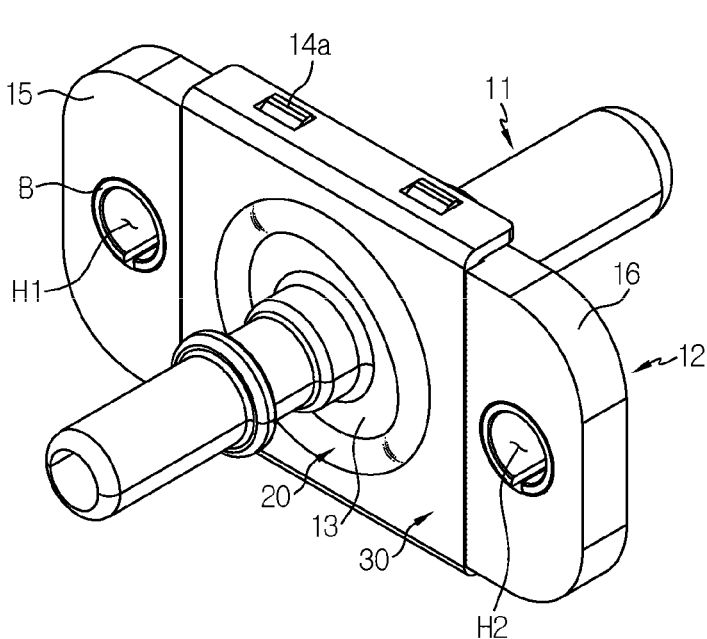

COOLANT PORT ASSEMBLY

TECHNICAL FIELD

The present disclosure relates to a coolant port assembly, and more particularly, to a coolant port assembly assembled to a battery pack to supply and discharge a coolant.

The present application claims priority to Korean Patent Application No. 10-2020-0146831 filed on Nov. 5, 2020 in the Republic of Korea, the disclosures of which are incorporated herein by reference.

BACKGROUND ART

A secondary battery refers to a battery that can be charged and discharged, unlike a primary battery that cannot be charged, and the secondary battery is used as a power source not only for small high-tech electronic devices such as mobile phones, PDAs, and notebook computers but also for energy storage systems (ESSs), electric vehicles (EVs), or hybrid electric vehicles (HEVs).

The secondary battery has a problem in that safety is greatly reduced, such as shortening the lifespan and causing malfunctions, if the heat accompanied with charging and discharging is not efficiently cooled. For this reason, in order to apply a secondary battery as an energy source for an electric vehicle, for example, a battery module is configured by connecting a plurality of lithium ion secondary batteries in series and/or in parallel, and a battery pack is configured by connecting such battery modules usually in series, the battery pack including a cooling system for properly managing the temperature of the battery modules.

There are various cooling systems, and recently, a cooling system that uses a coolant and absorbs heat from a battery module by allowing a heatsink having a flow path to contact the battery module is widely used. A battery pack to which the water-cooled cooling system is applied requires a connecting hose and a coolant port 1 as shown in FIG. 1 to supply a coolant to the heatsink.

A component such as the coolant port 1 usually includes a gasket 4 to ensure watertightness. For example, a groove 3 is formed at a body 2 of the coolant port 1, and the gasket 4 is assembled to the groove 3 by fitting. However, when the gasket 4 is assembled to the coolant port 1 as above, the gasket 4 often moves out of its position or is deviated during the process of transporting components or handling components on a pack assembly line.

In this case, the gasket 4 needs to be reassembled or rearranged, which acts as a factor that reduces the reliability of the watertight performance of the coolant port as well as the efficiency of the battery pack assembly process.

DISCLOSURE

Technical Problem

The present disclosure is designed to solve the problems of the related art, and therefore the present disclosure is directed to solving the problem that a sealing gasket is deviated from a coolant port that is stored in a state where the sealing gasket is assembled thereto.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a coolant port assembly, comprising: a coolant port including a port portion having a pipe shape having a predetermined length, and a plate-shaped mounting bracket portion formed at an outer circumference of the port portion to extend in a direction intersecting a longitudinal direction of the port portion; a sealing gasket provided in a ring shape that surrounds the outer circumference of the port portion; and a gasket cover configured to be coupled (e.g., closely coupled) to the mounting bracket portion together with the sealing gasket while pressing a part of the sealing gasket.

The gasket cover may be configured to be adhered (e.g., closely adhered) to the mounting bracket portion while covering an outer peripheral edge area of the sealing gasket.

The gasket cover may have a hole having a diameter greater than an inner diameter of the sealing gasket and smaller than an outer diameter of the sealing gasket, and the hole may gradually increase in a thickness direction of the gasket cover.

The mounting bracket portion may include a gasket hanging portion configured to have a diameter corresponding to an inner diameter of the sealing gasket so that the sealing gasket is covered on a periphery of the gasket hanging portion.

The mounting bracket portion may include a cover mounting portion engaging the gasket cover; and at least two side portions extending in a direction intersecting the longitudinal direction of the port portion with the cover mounting portion being interposed therebetween and to have a bolt fastening hole.

The at least two side portions may have a thickness greater than a thickness of the cover mounting portion by a thickness of the gasket cover.

The cover mounting portion may include a hook provided to at least one of a top end and a bottom end thereof, and the gasket cover may have a hooking hole provided to at least one of a top end and a bottom end thereof to be coupled with the hook.

The sealing gasket may be made of a rubber material or a silicone material.

The sealing gasket may include a joint portion formed along a circumferential direction to have a greater thickness at predetermined intervals.

In another aspect of the present disclosure, there is also provided a battery pack, comprising the coolant port assembly described above.

Advantageous Effects

According to an embodiment of the present disclosure, it is possible to provide a coolant port assembly that may promote sealing performance quality stabilization through flow prevention and removal prevention of the sealing gasket and increase efficiency of the assembly process when applied to a battery pack.

In addition, a person skilled in the art will clearly understand that various technical objects not mentioned above can be solved from the following disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a diagram showing an example of a conventional coolant port assembly.

FIG. 2 is a diagram showing a coolant port assembly according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In this specification, a coolant port assembly refers to a component of a coolant supply/discharge line system. Hereinafter, the following description will be on the assumption that the coolant port assembly is applied to a water-cooled battery pack. However, the use of the coolant port assembly in the present disclosure is not limited to a water-cooled battery pack. That is, the coolant port assembly may also be applied to a coolant supply/discharge line of devices other than the water-cooled battery pack.

Figure 3:
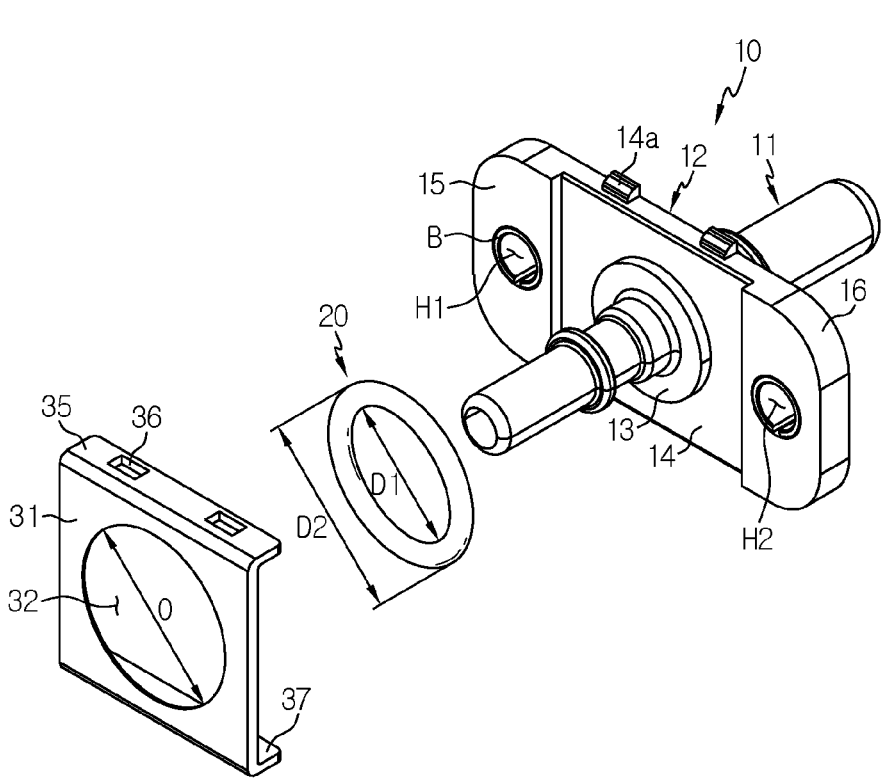
FIG. 3 is an exploded perspective view showing the coolant port assembly of FIG. 2.
Figure 4:
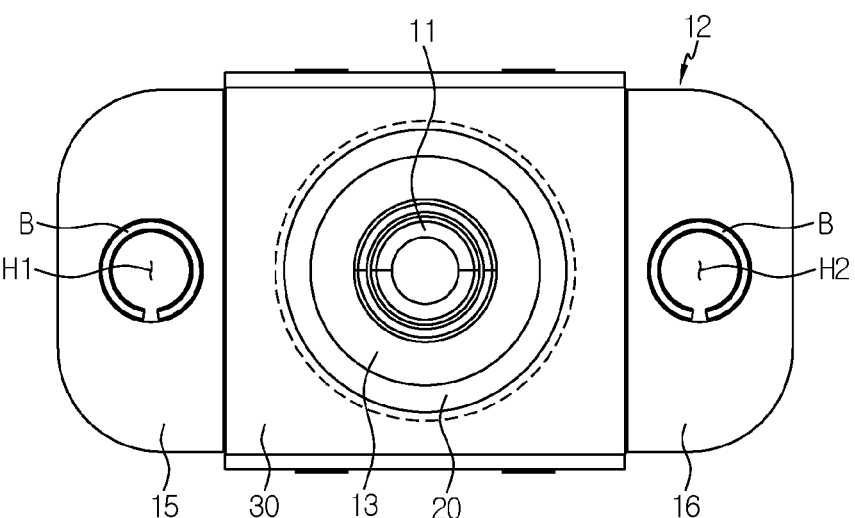
FIG. 4 is a front view showing the coolant port assembly of FIG. 2.

FIG. 2 is a diagram showing a coolant port assembly according to an embodiment of the present disclosure, FIG. 3 is an exploded perspective view showing the coolant port assembly of FIG. 2, and FIG. 4 is a front view showing the coolant port assembly of FIG. 2.

The coolant port assembly 100 according to an embodiment of the present disclosure includes a coolant port 10, a sealing gasket 20, and a gasket cover 30 as main components.

As shown in FIGS. 2 to 3, the coolant port 10 includes port portion 11 having a pipe shape formed to extend by a predetermined length, and a mounting bracket portion 12 formed at one side of an outer circumference of the port portion 11 to expand in a direction intersecting a longitudinal direction of the port portion 11.

The port portion 11 is, for example, a means installed over the inside and outside of a battery pack to connect an inner connection tube 220 and an outer connection tube 230 of the battery pack, and the mounting bracket portion 12 is a means for securely fixing the port portion 11 to a pack case.

The diameter of the port portion 11 may be changed according to the diameter of the inner connection tube 220, the outer connection tube 230, or a port hole 210a of the pack case connected thereto, and the length may be changed longer or shorter than this embodiment as needed. In addition, after the inner connection tube 220 or the outer connection tube 230 is connected to the port portion 11, a wrinkle pattern or the like may be provided on the outer circumference of the port portion 11 so that they are not easily separated.

The mounting bracket portion 12 has, for example, bolt fastening holes H1, H2, and may be provided in a plate shape for easy attachment to a wall surface 210 of the pack case. The mounting bracket portion 12 has the bolt fastening holes H1, H2 at locations spaced from the port portion 11 by a predetermined distance in a left and right direction (or upper and lower direction) so as not to interfere with the port portion 11 during bolt fastening, and is preferably manufactured to have a predetermined thickness so as not to be damaged due to torque when being attached to the wall surface 210 of the pack case using a bolt. Also, it is recommended to add a bushing B to the bolt fastening holes H1, H2 to prevent cracks in the bolt fastening holes H1, H2 during bolt fastening.

Meanwhile, in this embodiment, the mounting bracket portion 12 is implemented in a rectangular shape, but the scope of the present disclosure is not limited to this shape. The mounting bracket portion 12 may also be implemented in various forms such as a disk shape, a polygonal plate shape, and an oval plate shape.

The port portion 11 and the mounting bracket portion 12 may be integrally manufactured through injection molding by injecting a plastic resin into a mold. One of the port portion 11 and the mounting bracket portion 12 may be made of a plastic material and the other of the port portion 11 and the mounting bracket portion 12 may be made of a metal material by the insert injection molding.

When the coolant port 10 is mounted to the pack case, the sealing gasket 20 is used to secure the airtightness or watertightness of the corresponding portion to prevent foreign substances or moisture from entering the battery pack through a gap formed due to the difference in diameter between the port hole 210a and the port portion 11.

The sealing gasket 20 may be provided in a ring shape made of rubber or silicone material. In this embodiment, the sealing gasket 20 has a circular shape, but it may also be implemented in the form of a square ring or a polygonal ring.

The sealing gasket 20 may have an inner diameter D1 greater than the port portion 11, surround a peripheral outer side of the port portion 11, and be closely adhered to the front surface of the mounting bracket portion 12. As shown in FIG. 3, the mounting bracket portion 12 may include a gasket hanging portion 13 capable of covering the sealing gasket 20. The gasket hanging portion 13 is provided in the shape of a protruding disk having a diameter corresponding to the inner diameter of the sealing gasket 20, but the protrusion degree of the gasket hanging portion 13 is lower than the thickness of the sealing gasket 20.

The sealing gasket 20 of this embodiment is made of rubber or silicone material to have elasticity. Therefore, for example, the sealing gasket 20 may be covered on the gasket hanging portion 13 by hanging a part of the peripheral portion of the sealing gasket 20 on the gasket hanging portion 13 and pulling the remaining peripheral portion slightly. In this way, as the sealing gasket 20 is covered on the gasket hanging portion 13, the fixability of the sealing gasket 20 may be secured to some extent.

The gasket cover 30 is used as a means to prevent the sealing gasket 20 from being deviated from its original position or from being removed due to impact or the like while the coolant port 10 is being transported or being assembled to the pack case.

Specifically, as shown in FIG. 3, the gasket cover 30 according to this embodiment includes a plate-shaped body portion 31 having a perforated hole 32 at a center thereof, a top end bent portion 35 bent toward the front surface of the mounting bracket portion 12 at an upper edge of the body portion 31, and a bottom end bent portion 37 bent toward the front surface of the mounting bracket portion 12 at a lower edge of the body portion 31.

The mounting bracket portion 12 may include a cover mounting portion 14 engraved to engage with the gasket cover 30, and at least two side portions 15, 16 formed to extend in a direction intersecting the longitudinal direction of the port portion 11 with the cover mounting portion 14 being interposed therebetween and having bolt fastening holes H1, H2. The side portions 15, 16 may be formed to be thicker than the cover mounting portion 14 by the thickness of the gasket cover 30.

The cover mounting portion 14 has two hooks 14a at the top end and the bottom end, respectively, and the gasket cover 30 may have two hooking holes 36 at the top end bent portion 35 and the bottom end bent portion 37, respectively, to be coupled with the two hooks 14a by hooking.

With the above configuration, the gasket cover 30 may be closely coupled to the cover mounting portion 14 of the mounting bracket portion 12 as shown in FIG. 2. At this time, the front surface of the body portion 31 and the front surfaces of the side portions 15, 16 are placed on the same plane, and the sealing gasket 20 may protrude further to the front compared to the front surface of the body portion 31 of the gasket cover 30 and the front surfaces of the side portions 15, 16.

In particular, the gasket cover 30 may be closely coupled to the mounting bracket portion 12 together with the sealing gasket 20 while pressing a part of the sealing gasket 20.

Figures 5, 6:
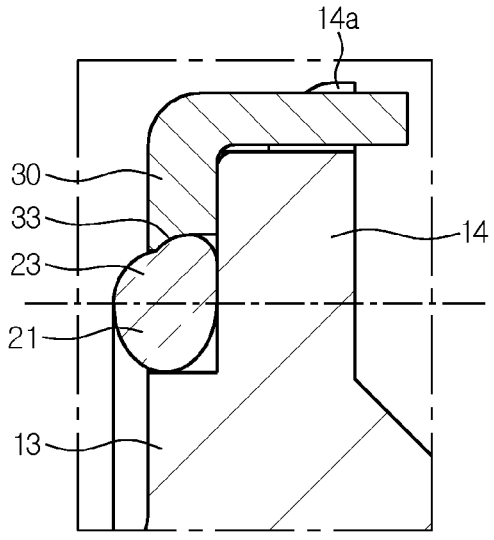
FIG. 5 is a sectional view showing the coolant port assembly of FIG. 2.
FIG. 6 is a partially enlarged view of FIG. 5.

The perforated hole 32 of the gasket cover 30 may be formed to have a diameter O greater than the inner diameter D1 of the sealing gasket 20 and smaller than the outer diameter D2 of the sealing gasket 20, when the coolant port 10 is viewed from the front. In this case, as shown in FIGS. 4 to 5, the outer edge area of the sealing gasket 20 may be pressed by the gasket cover 30 while the gasket cover 30 is being closely adhered to the cover mounting portion 14. Here, the outer edge area of the sealing gasket 20 refers to an area between the dotted line of FIG. 4 and the inner solid line adjacent thereto.

In addition, the perforated hole 32 of the gasket cover 30 may be formed to gradually expand in the thickness direction of the gasket cover 30, as shown in FIG. 6. That is, the perforated hole 32 may be provided to have an inner circumference 33 that is slightly expanded from the front surface to the rear surface of the gasket cover 30.

According to this configuration, while the outer edge area 23 of the sealing gasket 20 is being pressed, the rear surface of the body portion 31 of the gasket cover 30 may be brought into contact with the front surface of the cover mounting portion 14, so that a step difference is not formed between the gasket cover 30 and the side portions 15, 16 and the damage to the sealing gasket 20 is reduced. In addition, the inner edge area 21 of the sealing gasket 20 abuts against the gasket hanging portion 13, and the outer edge area 23 of the sealing gasket 20 is pressed by the gasket cover 30, so that the sealing gasket 20 may be fixed more strongly.

If the gasket cover 30 is mounted to the mounting bracket portion 12 as above, the sealing gasket 20 is not deviated from its original position or is not removed even if there is a strong impact while the coolant port 10 is being transported or the coolant port 10 is being assembled to the pack case.

Therefore, when the coolant port assembly 100 according to the present disclosure is applied to the battery pack, the sealing performance quality stabilization and the assembly process efficiency may be promoted by preventing the sealing gasket 20 from moving and being removed.

Figure 7:
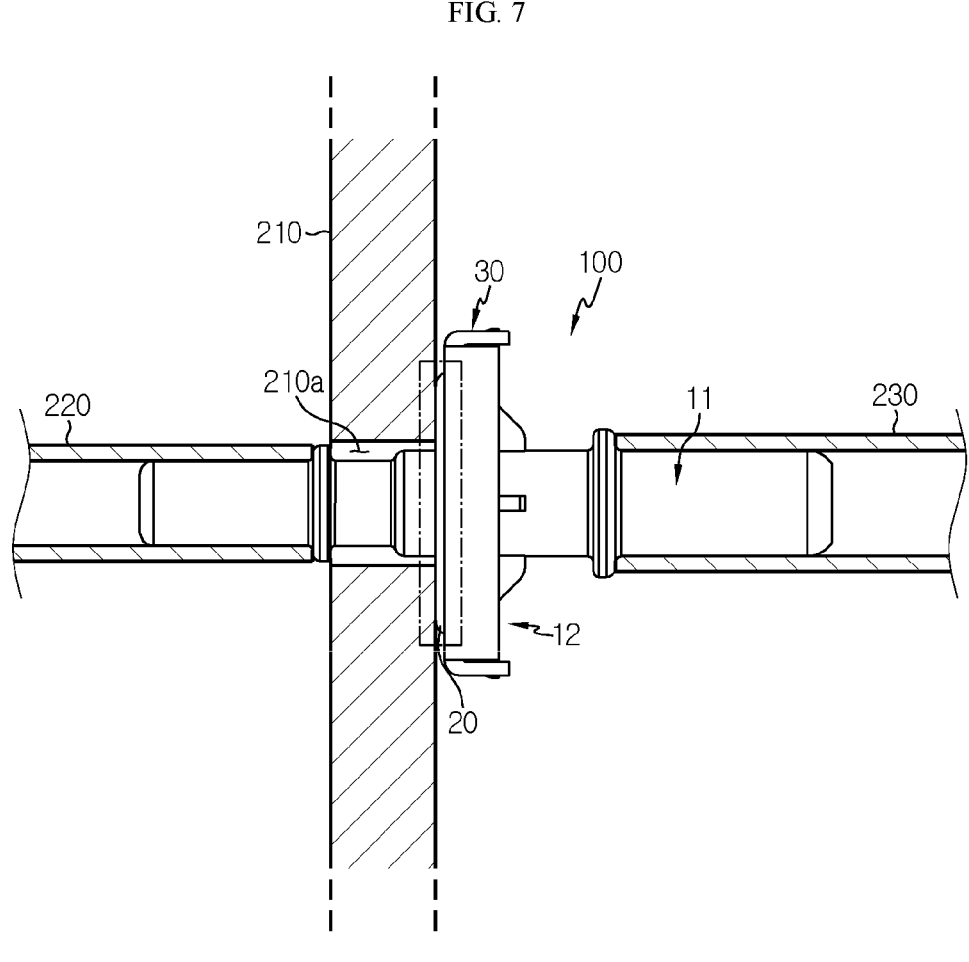
FIG. 7 is a diagram showing an example in which the coolant port assembly according to an embodiment of the present disclosure is used.

For reference, as shown in FIG. 7, the coolant port assembly 100 of the present disclosure may be installed on the wall surface 210 of the pack case. For example, the front end of the port portion 11 is inserted into the port hole of the pack case until the sealing gasket 20 contacts the wall surface of the pack case. Then, the mounting bracket portion 12 is fixed to the wall surface 210 of the pack case using a bolt (not shown). At this time, since the sealing gasket 20 is strongly adhered to the wall surface 210 of the pack case at the peripheral outer side of the port hole 210a, the airtightness and watertightness of the port hole 210a may be reliably secured even if there is a gap between the port hole 210a and the port portion 11.

Meanwhile, the inner connection tube 220 of the battery pack may be connected to the front end of the coolant port 10 during the assembly process of the battery pack, and the outer connection tube 230 may be connected to the rear end of the port portion 11 if necessary. The inner connection tube 220 may lead to an inlet of a heatsink that is in contact with each battery module inside the battery pack, and the outer connection tube 230 may lead to a coolant reservoir outside the battery pack.

Figure 8:
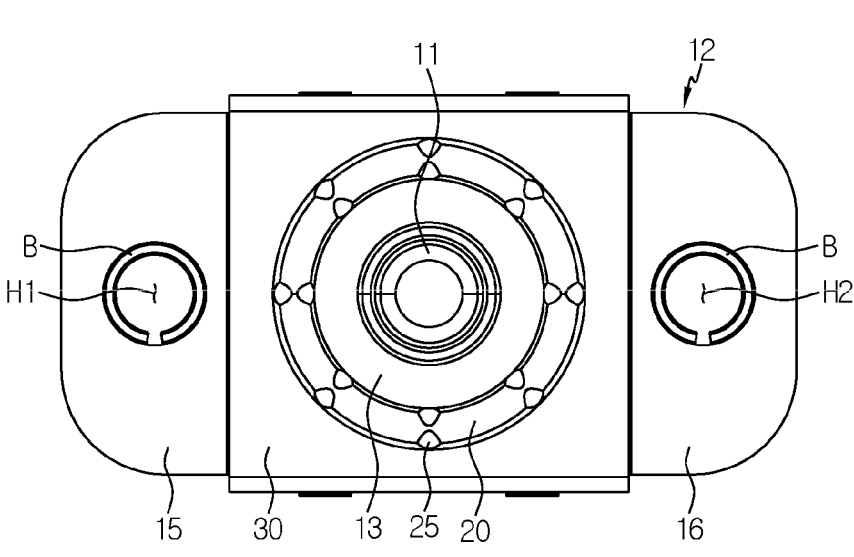
FIG. 8 is a front view showing a coolant port assembly according to another embodiment of the present disclosure.

FIG. 8 is a front view showing a coolant port assembly according to another embodiment of the present disclosure.

Next, another embodiment of the present disclosure will be briefly described with reference to FIG. 8. The same reference signs as in the former embodiment denote the same components and will not be described in detail again.

The coolant port assembly according to another embodiment of the present disclosure has a difference in the configuration of the sealing gasket 20 compared to the former embodiment.

The sealing gasket 20 according to this embodiment further includes a joint portion 25 that is formed thicker at every predetermined interval along the circumferential direction. The joint portion 25 may be regarded as a component to increase the durability of the sealing gasket 20 and to increase the adhesion between the gasket hanging portion 13 and the gasket cover 30.

As shown in FIG. 8, in the sealing gasket 20, the inner surface portion of the joint portion 25 strongly abuts against the gasket hanging portion 13, and the outer surface portion of the joint portion 25 strongly abuts against the inner circumference of the perforated hole 32 of the gasket cover 30. The inner surface portion and the outer surface portion of the joint portion 25 may be pressed more strongly by the gasket hanging portion 13 and the inner circumference of the gasket cover 30, respectively, thereby securing fixation.

Meanwhile, the battery pack according to the present disclosure is a water-cooled battery pack and may be configured to include at least one coolant port assembly 100 described above. In addition to the coolant port assembly 100, the battery pack may further include a battery module, which is an assembly of battery cells, a control device for controlling charge/discharge and current flow based on voltage and temperature of the battery module, such as a BMS, a fuse and a relay, and cooling components such as a heatsink for cooling the battery module.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, in this specification, although terms indicating directions such as "upper", "lower", "left", and "right" are used, these terms are only for convenience of explanation, and it is obvious to those skilled in the art that such terms may be expressed differently depending on the viewing position of an observer or the location of an object.

What is claimed is:

1. A coolant port assembly, comprising:
a coolant port including a port portion having a pipe shape having a predetermined length, and a mounting bracket portion formed at an outer circumference of the port portion to extend in a direction intersecting a longitudinal direction of the port portion;
a sealing gasket provided in a ring shape that surrounds the outer circumference of the port portion; and
a gasket cover configured to be coupled to the mounting bracket portion by mating connectors integrally formed with the gasket cover and the mounting bracket portion together with the sealing gasket while pressing a part of the sealing gasket,
wherein the mounting bracket portion includes:
a cover mounting portion engaging the gasket cover; and
at least two side portions extending in a direction intersecting the longitudinal direction of the port portion with the cover mounting portion being interposed therebetween and to have a bolt fastening hole,
wherein the cover mounting portion is recessed relative to the at least two side portions.

2. The coolant port assembly according to claim 1, wherein the gasket cover is configured to be adhered to the mounting bracket portion while covering an outer peripheral edge area of the sealing gasket.

3. A coolant port assembly, comprising:
a coolant port including a port portion having a pipe shape having a predetermined length, and a mounting bracket portion formed at an outer circumference of the port portion to extend in a direction intersecting a longitudinal direction of the port portion;
a sealing gasket provided in a ring shape that surrounds the outer circumference of the port portion; and
a gasket cover configured to be coupled to the mounting bracket portion together with the sealing gasket while pressing a part of the sealing gasket,
wherein the gasket cover has a hole having a diameter greater than an inner diameter of the sealing gasket and smaller than an outer diameter of the sealing gasket, and
wherein the hole gradually increases in diameter in a thickness direction of the gasket cover.

4. The coolant port assembly according to claim 1, wherein the mounting bracket portion includes a gasket hanging portion configured to have a diameter corresponding to an inner diameter of the sealing gasket so that the sealing gasket is covered on a periphery of the gasket hanging portion.

5. The coolant port assembly according to claim 1, wherein the at least two side portions have a thickness greater than a thickness of the cover mounting portion by a thickness of the gasket cover.

6. The coolant port assembly according to claim 1, wherein the mating connectors include a hook provided to at least one of a top end or a bottom end of the cover mounting portion, and
a hooking hole provided to at least one of a top end and a bottom end of the gasket cover to be coupled with the hook.

7. The coolant port assembly according to claim 1, wherein the sealing gasket is made of a rubber material or a silicone material.

8. The coolant port assembly according to claim 1, wherein the sealing gasket includes a joint portion formed along a circumferential direction to have a greater thickness at predetermined intervals.

9. A battery pack, comprising the coolant port assembly according to claim 1.

* * * * *